Oct. 28, 1952     C. E. JOHNSON     2,615,527
TRAP AND ESCUTCHEON
Filed May 18, 1950
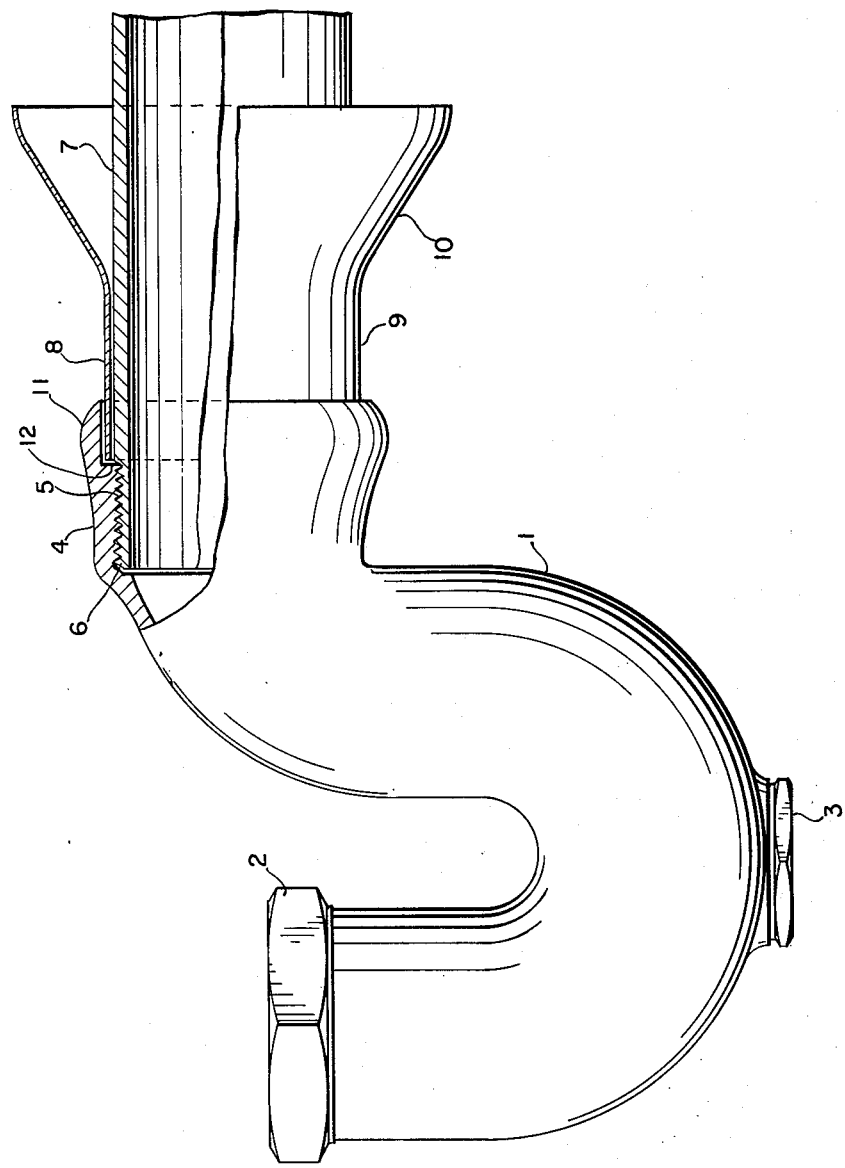
INVENTOR
*Charles E. Johnson*
BY
*Pennie, Edmonds, Morton & Barrows*
ATTORNEYS Patented Oct. 28, 1952

2,615,527

UNITED STATES PATENT OFFICE 2,615,527

TRAP AND ESCUTCHEON

Charles E. Johnson, Dennis, Mass.

Application May 18, 1950, Serial No. 162,635

2 Claims. (Cl. 182—7)

This invention relates to improvements in traps used on wash basins, sinks and the like, and has for its object the provision of means whereby a neat joint can be made with the cover tube or escutcheon, which overlies the nipple to which one end of the trap is connected, without effort or skill on the part of the plumber.

In the usual construction, the upper end of the drain terminates in a threaded nipple which projects horizontally from the wall on which the basin is mounted or against which it stands. This nipple, being usually plain and undecorated, is ordinarily provided with a chrome plated cover tube or escutcheon which abuts the wall at its inner end to surround and hide the opening in the wall through which the nipple passes. The other end of the cover tube extends outwardly to the threads where it makes a butt joint with the threaded end of the trap. Because of building and assembly errors, the making of this butt joint is a slow and laborious process requiring considerable skill; labor, time and skill being necessary if an acceptable job is to be done. I avoid this necessity in accordance with the present invention by providing the end of the trap with a collar extending beyond the threads and having an internal diameter slightly greater than the external diameter of the cover tube. Thus when the trap is mounted on the nipple, the collar overlies the end of the cover tube and any space between the threaded section of the trap and the end of the tube is hidden.

In the accompanying drawing, I have illustrated a preferred embodiment of my invention. This drawing illustrates, partly in elevation and partly in section, a ½ S trap modified in accordance with the present invention and mounted upon a nipple provided with a cover tube or escutcheon.

In the drawing, 1 represents a trap provided with a standard coupling nut 2 and a plug 3. The discharge end 4 is provided with an internally threaded section 5 shown in engagement with an externally threaded section 6 on the outer end of a nipple 7. Enveloping the outer end of the nipple, but stopping short of the threads 6, is a cover tube or escutcheon 8 having a cylindrical body 9 and a conically flared inner end 10 which normally abuts against the wall, not shown, to surround and hide the hole therein through which the nipple passes.

The threaded end of the trap is provided in accordance with the present invention with a cylindrical collar 11 which extends beyond the threaded section 5 and has an internal diameter greater than the internal diameter of that section and slightly greater than the external diameter of the cylindrical body portion 9 of the cover tube 8. Thus the extension 11 of the trap overlies the end of the cover tube when the parts are assembled, as shown in the drawing. It will be noted that there is a space between the end of the cover tube and a circumferential shoulder 12 which extends outwardly from the outer end of the threaded section of the trap. In the absence of the collar 11, this space would be visible and the construction would not be acceptable for that reason. With the trap provided with an extension in accordance with my invention, this space is completely hidden and there is no occasion for the plumber to spend the time and labor required to make a finished butt joint.

I claim:

1. The combination of a trap having an internally-threaded end, a nipple having an externally-threaded end screwed to said threaded end of the trap, a cover tube on the nipple having one end flaring outwardly and adapted to surround and hide an opening in a wall through which the nipple may extend, and a cylindrical collar on the trap having a cylindrical inner wall extending beyond the threads of the trap and over the other end of the cover tube, a circumferential shoulder extending outwardly at the outer end of the internally threaded end of the trap to the inner end of the cylindrical collar, said shoulder being of such width that the inner wall has a diameter sufficiently greater than the external diameter of said other end of the cover tube to permit free and easy insertion of said other end of the cover tube into the space between the inner wall and the nipple.

2. The combination defined in claim 1 in which the cylindrical collar is integral with the trap.

CHARLES E. JOHNSON.

REFERENCES CITED

The following references are of record in the file of this patent:

UNITED STATES PATENTS

| Number | Name | Date |
|---|---|---|
| 129,691 | Tasker | July 23, 1872 |
| 1,495,303 | Heidelberg | May 27, 1924 |
| 1,617,333 | Hutchings | Feb. 15, 1927 |
| 1,847,917 | Binns | Mar. 1, 1932 |

FOREIGN PATENTS

| Number | Country | Date |
|---|---|---|
| 341,191 | Great Britain | Jan. 15, 1931 |
| 592,653 | Great Britain | Sept. 24, 1947 |